United States Patent
Neul

(10) Patent No.: US 9,863,770 B2
(45) Date of Patent: Jan. 9, 2018

(54) VIBRATION-RESISTANT ROTATION RATE SENSOR

(71) Applicant: Robert Bosch GmbH, Stuttgart (DE)

(72) Inventor: Reinhard Neul, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 257 days.

(21) Appl. No.: 14/536,918

(22) Filed: Nov. 10, 2014

(65) Prior Publication Data

US 2015/0128700 A1    May 14, 2015

(30) Foreign Application Priority Data

Nov. 14, 2013  (DE) .................. 10 2013 223 227

(51) Int. Cl.
    *G01C 19/56*     (2012.01)
    *G01C 19/5726*   (2012.01)
    *G01C 19/574*    (2012.01)

(52) U.S. Cl.
    CPC ....... *G01C 19/5726* (2013.01); *G01C 19/574* (2013.01)

(58) Field of Classification Search
    CPC .............. G01C 19/5733; G01C 19/574; G01C 19/5747

USPC ...................................... 73/504.12
See application file for complete search history.

(56) References Cited

U.S. PATENT DOCUMENTS

| 2011/0154898 A1* | 6/2011 | Cazzaniga | G01C 19/5747 73/504.12 |
| 2014/0260608 A1* | 9/2014 | Lin | G01C 19/5747 73/504.12 |

* cited by examiner

*Primary Examiner* — John Chapman, Jr.
(74) *Attorney, Agent, or Firm* — Norton Rose Fulbright US LLP; Gerard Messina

(57) ABSTRACT

A rotation rate sensor includes a substrate having a main extension plane and multiple seismic masses, in which for each seismic mass the following applies: the seismic mass is drivable at a drive oscillation, which occurs along a drive direction situated parallel to the main extension plane, the seismic mass is deflectable along two different deflection directions, each direction being perpendicular to the drive direction, the rotation rate sensor being configured to generate detection signals as a function of detected deflections of the seismic masses, one detection signal of the detection signals being associated with each deflection direction of the seismic masses, the rotation rate sensor being configured so that a linear, rotational and centrifugal acceleration of the rotation rate sensor are compensated with respect to at least one rotation axis of the rotation rate sensor through compensation in each case of two corresponding detection signals of the detection signals.

8 Claims, 15 Drawing Sheets

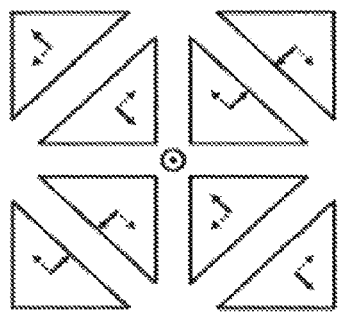 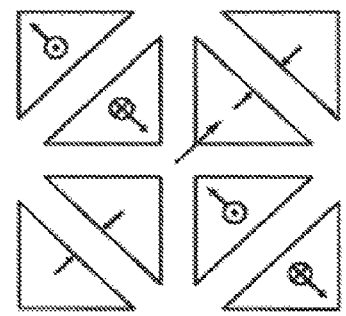 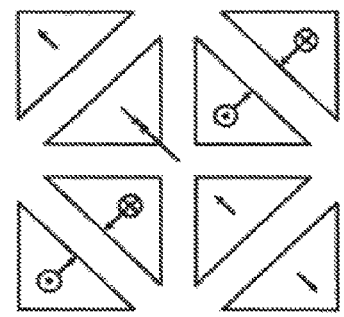
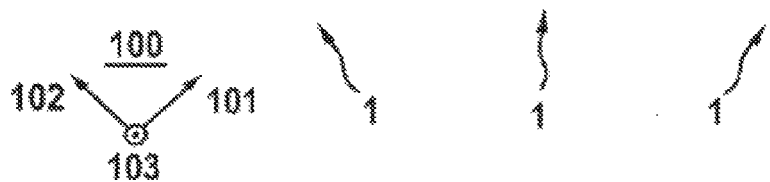
FIG. 3A  FIG. 3B  FIG. 3C
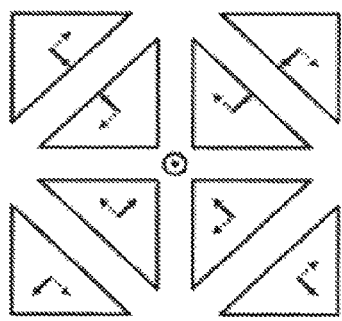 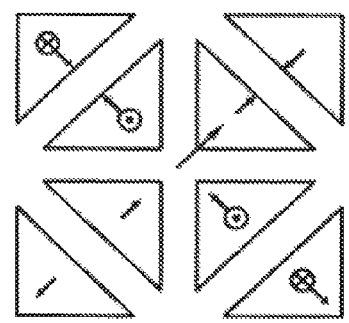 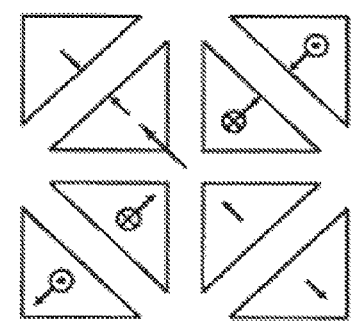
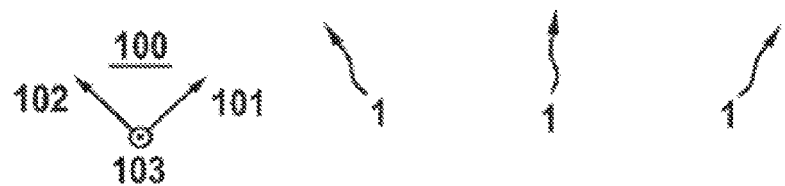
FIG. 4A  FIG. 4B  FIG. 4C

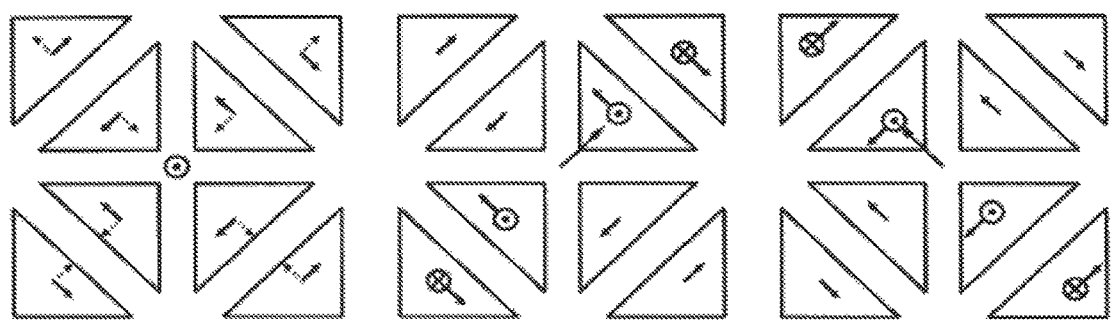
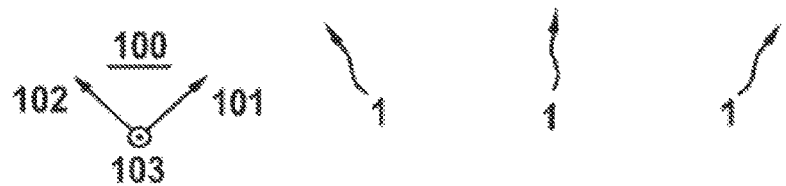
FIG. 7A  FIG. 7B  FIG. 7C

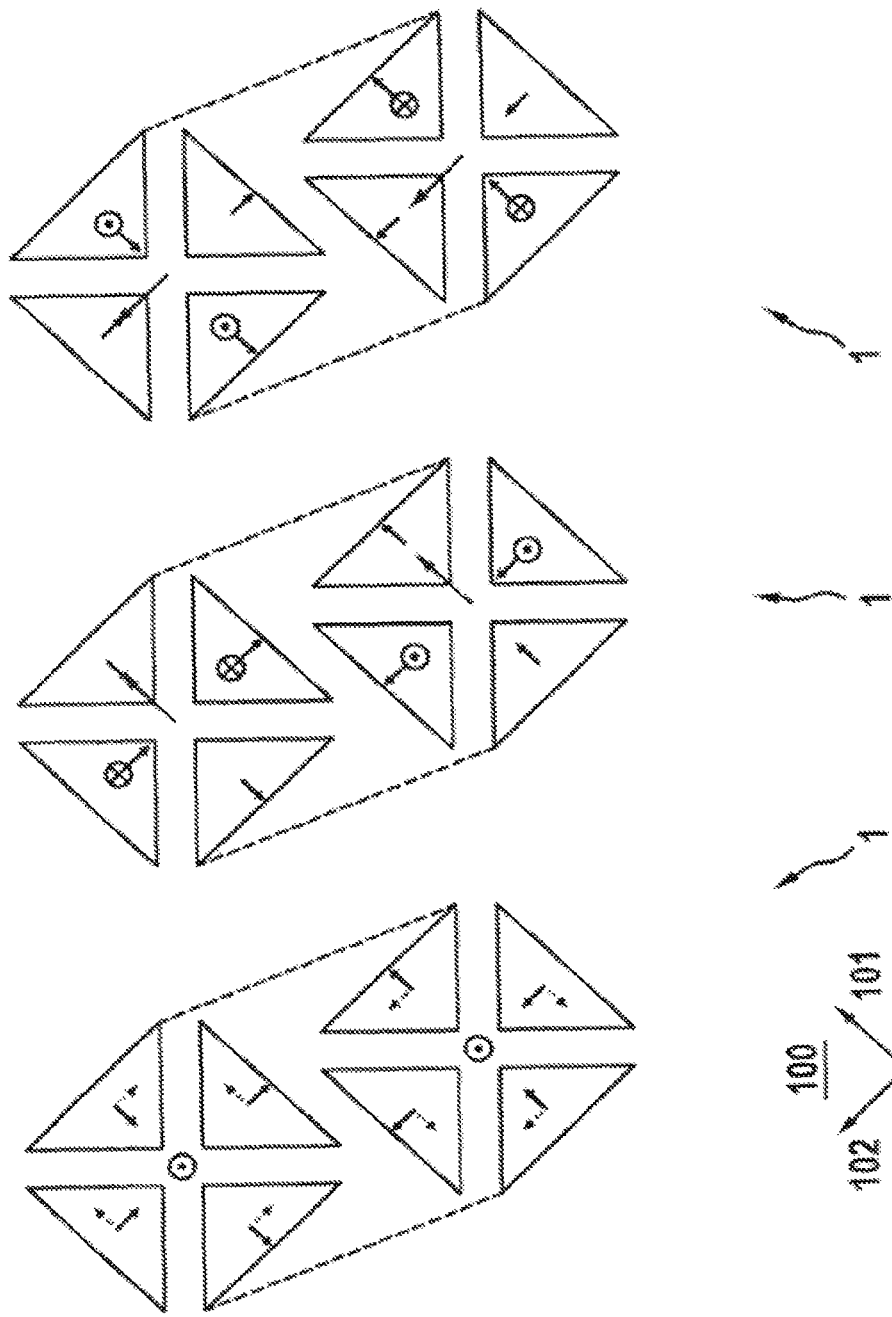

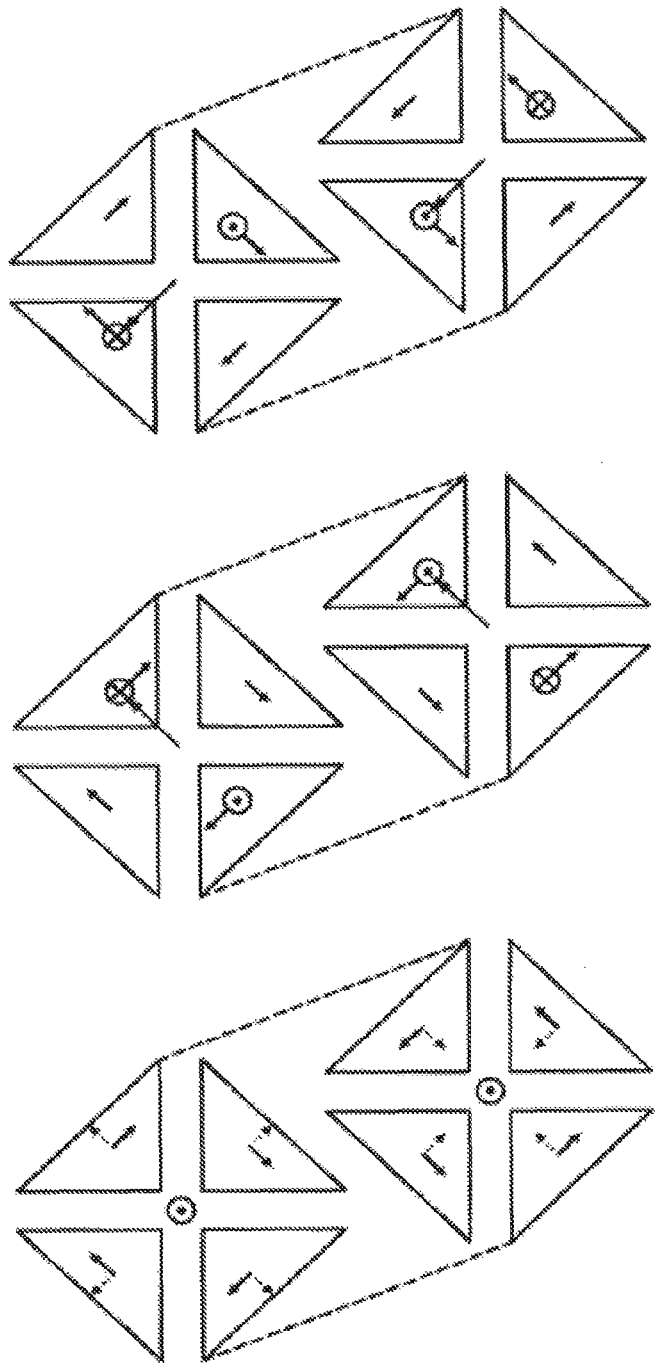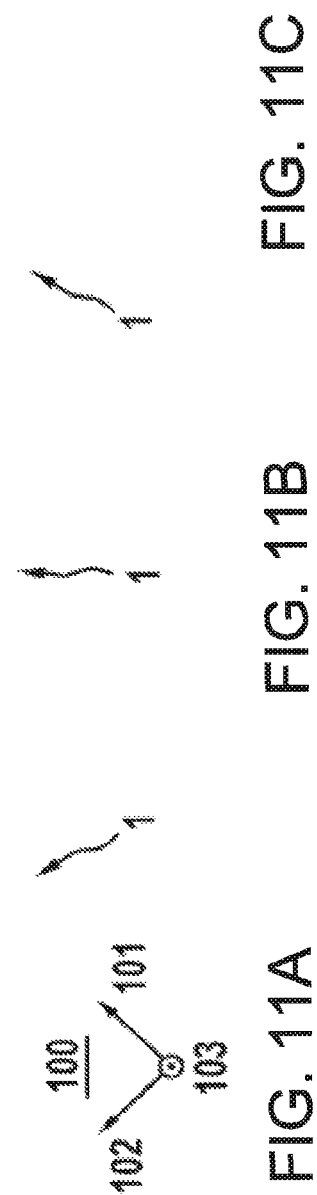
FIG. 11A  FIG. 11B  FIG. 11C

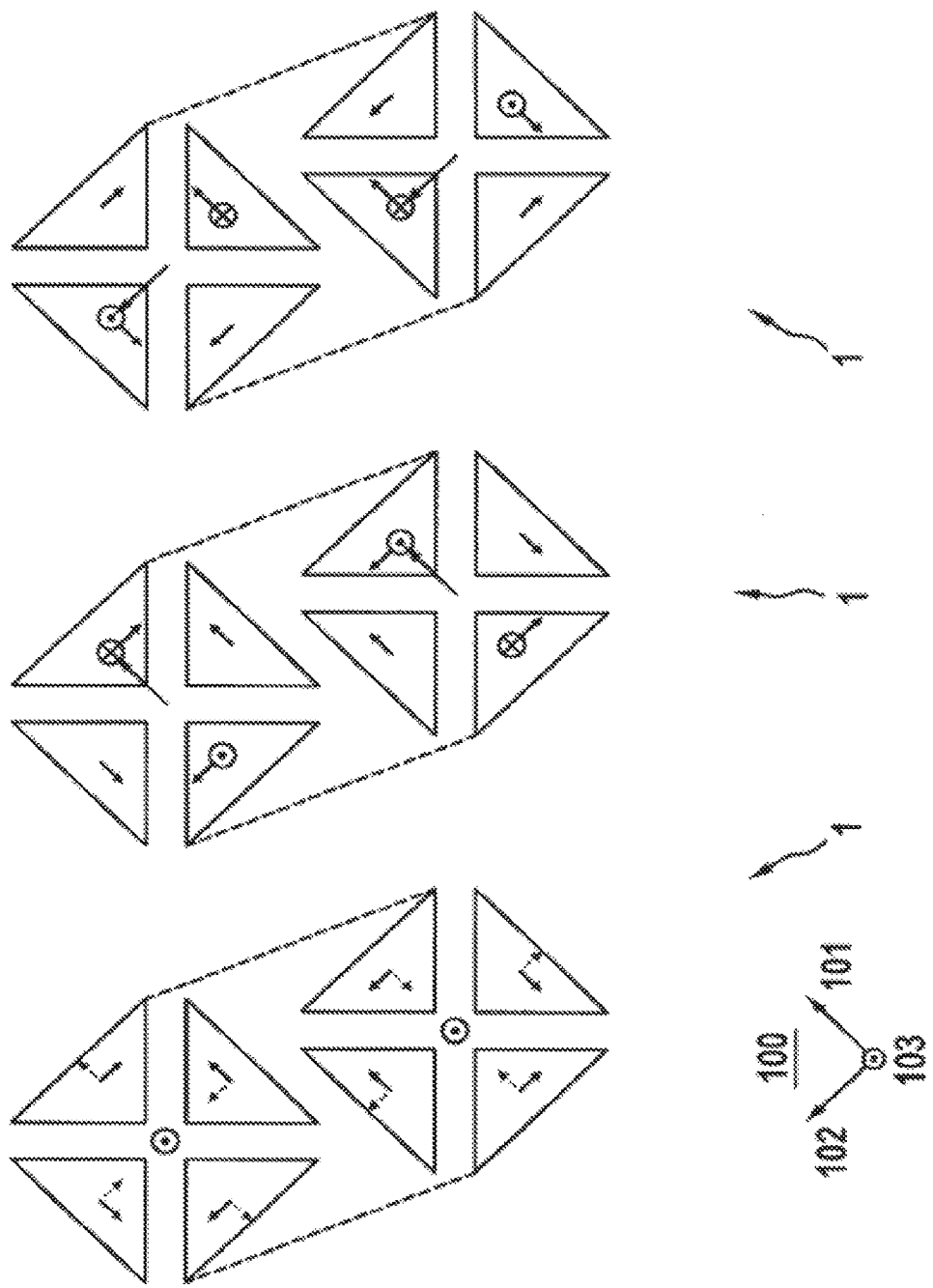

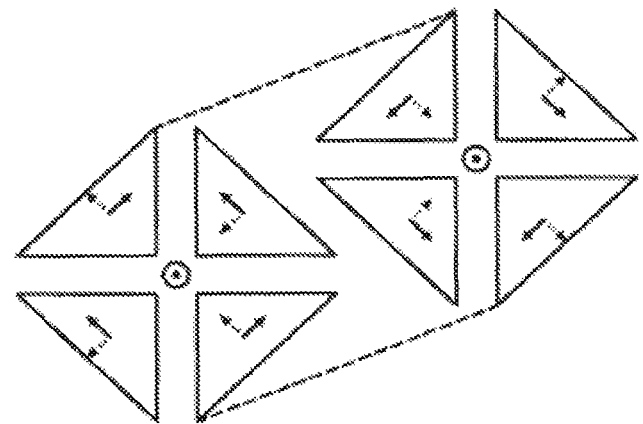
FIG. 13A
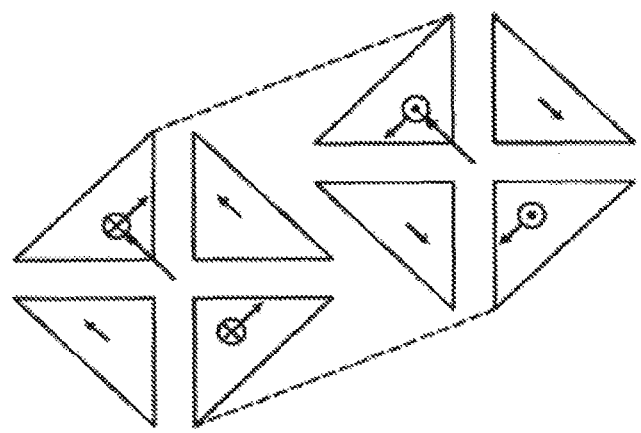
FIG. 13B
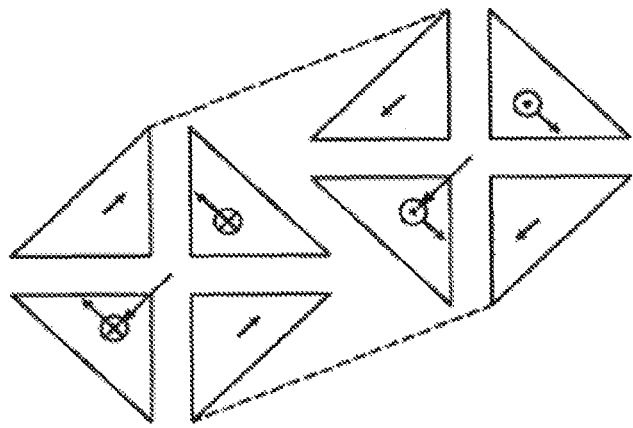
FIG. 13C
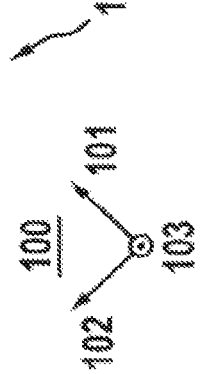

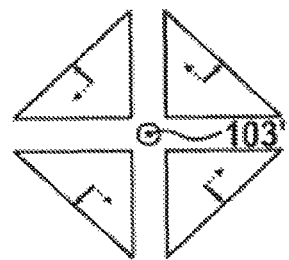 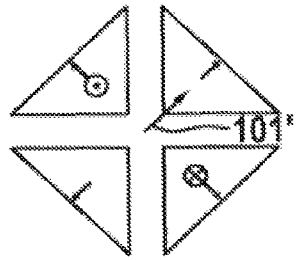 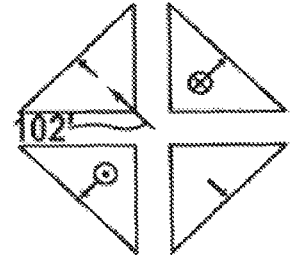
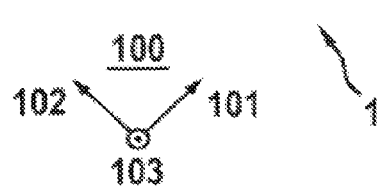
FIG. 14A　　　FIG. 14B　　　FIG. 14C
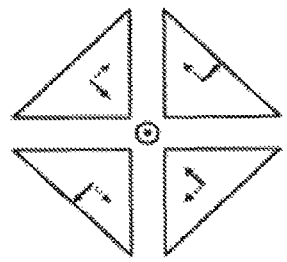 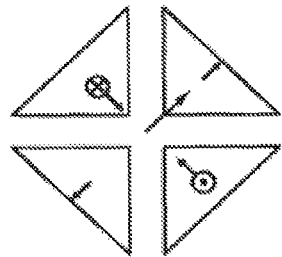 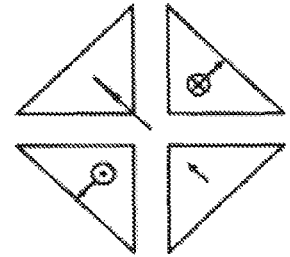
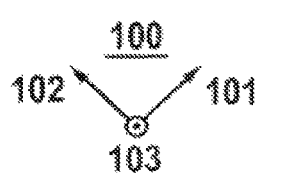
FIG. 15A　　　FIG. 15B　　　FIG. 15C

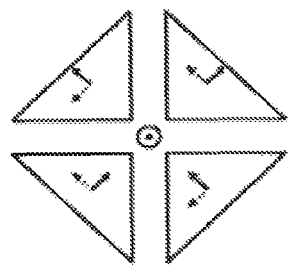 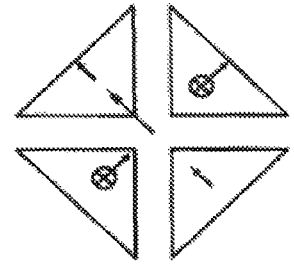
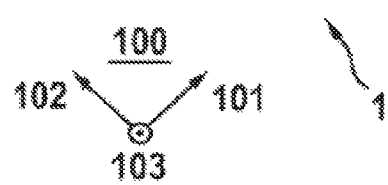
FIG. 16A  FIG. 16B  FIG. 16C
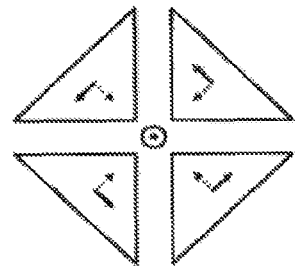 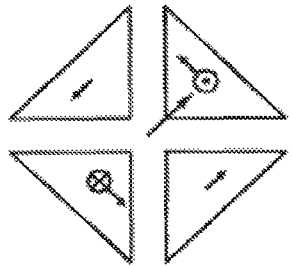 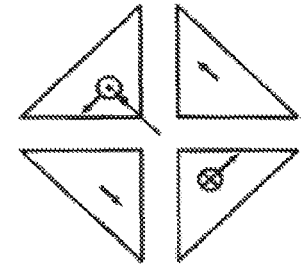
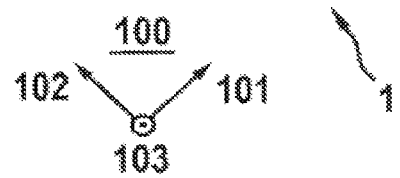
FIG. 17A  FIG. 17B  FIG. 17C

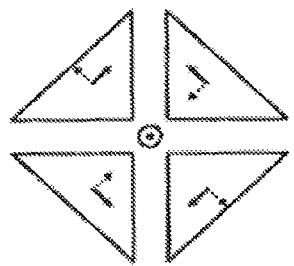 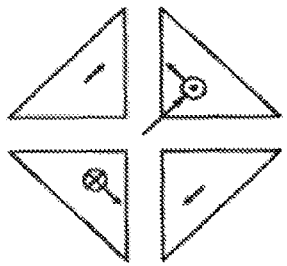 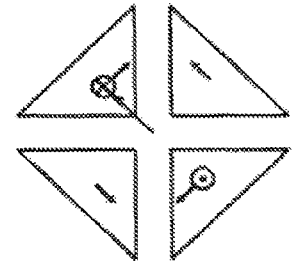
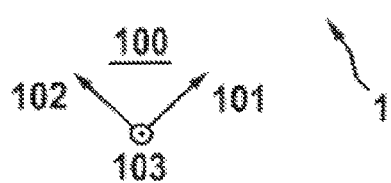
FIG. 18A            FIG. 18B            FIG. 18C
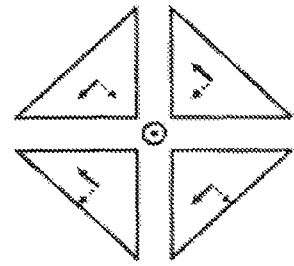 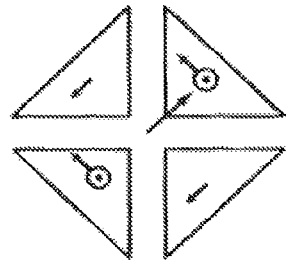 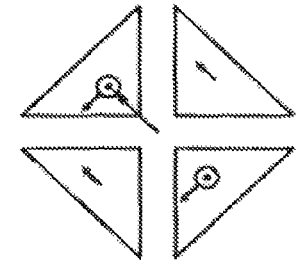
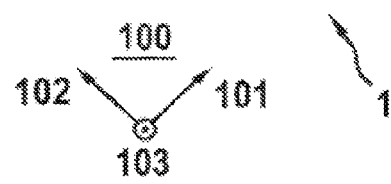
FIG. 19A            FIG. 19B            FIG. 19C

VIBRATION-RESISTANT ROTATION RATE SENSOR

RELATED APPLICATION INFORMATION

The present application claims priority to and the benefit of German patent application no. 10 2013 223 227.6, which was filed in Germany on Nov. 14, 2013, the disclosure of which is incorporated herein by reference.

FIELD OF THE INVENTION

The present invention is directed to a rotation rate sensor.

Such rotation rate sensors are generally known. However, known rotation rate sensors have a comparatively high sensitivity to external interferences, an interfering signal influencing the function of the rotation rate sensor being generated in the rotation rate sensor. Such interferences are, for example, accelerations of the rotation rate sensor.

SUMMARY OF THE INVENTION

Therefore, an object of the present invention is to provide a rotation rate sensor having improved vibration resistance, thereby ensuring a more reliable operation of the rotation rate sensor, even under the influence of external interferences.

The rotation rate sensor according to the present invention and the method according to the present invention for operating a rotation rate sensor as recited in the other independent claims have the advantage over the related art that a rotation rate sensor having improved vibration resistance is provided, the rotation rate sensor functioning more reliably even under the influence of comparatively sharply pronounced, external interfering accelerations, for example, linear accelerations and/or rotational accelerations having particular spectral components or vibrations. The rotation rate sensor according to the present invention is comparatively insensitive to such interfering accelerations, since the rotation rate sensor is able to compensate for external linear accelerations and/or rotational accelerations during measurement, thereby improving, in particular, the measuring accuracy. In this case, the seismic masses of the rotation rate sensor are situated or configured in such a way, and/or caused to vibrate in such a way, that the susceptibility or sensitivity to external interferences—in this case, in particular, linear accelerations and/or rotational accelerations—is minimized. The rotation rate sensor may be a triaxial rotation rate sensor, the triaxial rotation rate sensor being configured in each case to detect a rotation rate with respect to a rotational movement about the first, second and third rotation axis.

Each seismic mass may be deflected as a function of an acceleration along one or both of its respective deflection directions, the acceleration including a Coriolis acceleration, linear acceleration, rotational acceleration, centrifugal acceleration and/or a total of the aforementioned partial accelerations, the respective detection signal being generated as a function of the deflection. In this case, the Coriolis acceleration in particular is a measure for the rotation rate. The rotation rate sensor may include a detection device, with the aid of which the multiple detection signals are generated, in particular one detection element of the detection device being associated with each deflection direction of each seismic mass. To detect the deflection, the detection device has, in particular, a comb electrode structure, a plate electrode structure, a piezoelectric structure, a piezoresistive structure, an electromagnetic structure, a magnetostrictive structure and/or an optical structure. In particular, the evaluation device is configured for determining the first, second and/or third rotation rate with the aid of electronic and/or digital signal processing.

A rotational movement of the rotation rate sensor may be composed of a first rotational movement about the first rotation axis, a second rotational movement about the second rotation axis and a third rotational movement about the third rotation axis. This applies accordingly to the rotational acceleration and the centrifugal acceleration, the respective components being referred to accordingly as first, second and third rotational acceleration, respectively first, second and third centrifugal acceleration. The seismic masses may be drivable independently of one another at the respective drive oscillations.

Advantageous embodiments and refinements of the present invention can be derived from the further descriptions herein and the description with reference to the drawings.

According to one refinement, it is provided that the rotation rate sensor is configured in such a way that the linear acceleration, the rotational acceleration and the centrifugal acceleration of the rotation rate sensor are compensated for with respect to three different rotation axes of the rotation rate sensor as a function of the multiple detection signals.

This makes it advantageously possible to ensure a more reliable operation of the rotation rate sensor, even under the influence of external interferences on all three rotation axes or sensitivity axes, a linear acceleration, a rotational acceleration and/or a centrifugal acceleration being compensated for with respect to each rotation axis.

According to another refinement, it is provided that the rotation rate sensor is configured in such a way that the linear acceleration, the rotational acceleration and the centrifugal acceleration are compensated for by calculating the total of, and/or by calculating the difference between, the multiple detection signals.

This makes it advantageously possible to achieve an improved compensation for external interferences and a more reliable operation of the rotation rate sensor in a particularly efficient and simple manner.

According to another refinement, it is provided that the rotation rate sensor includes an evaluation device, the multiple seismic masses being situated in such a way and drivable at the drive oscillations, that the linear acceleration, the rotational acceleration and the centrifugal acceleration may be compensated for with respect to each of the three rotation axes by the evaluation device through compensation of the corresponding detection signals.

This makes it advantageously possible for the multiple seismic masses to be situated in such a way that a first rotational acceleration is compensated for with respect to a first rotational movement about the first rotation axis, a second rotational acceleration is compensated for with respect to a second rotational movement about the second rotation axis, and a third rotational acceleration is compensated for with respect to a third rotational movement about the third rotation axis and, in addition, a first, second and third linear acceleration are compensated for along the first, second and third rotation axis. Thus, it is possible to detect the rotation rate with a high degree of accuracy, the susceptibility of the rotation rate sensor with respect to external interferences—such as linear accelerations and rotational accelerations—being minimized as a function of the arrangement of the seismic masses.

According to another refinement, it is provided that the multiple seismic masses are resiliently connected to one another and to the substrate in such a way that the multiple seismic masses are drivable at the drive oscillations, such that the linear acceleration, the rotational acceleration and the centrifugal acceleration may be compensated for with respect to the three rotation axes.

This makes it advantageously possible—in addition to the linear acceleration and the rotational acceleration—for the centrifugal acceleration to also be compensated for, as a result of which the susceptibility or sensitivity of the rotation rate sensor with respect to undesirable interference accelerations is even further improved. The linear acceleration of the rotation rate sensor along the first, second and/or third rotation axis, the rotational acceleration of a first, second and/or third rotational movement about the first, second and third rotation axis, and the centrifugal acceleration of the first, second and/or third rotational movement about the first, second and third rotation axis may be compensated for.

According to another refinement, it is provided that the multiple seismic masses include at least four seismic masses, the at least four seismic masses extending mainly along a drive plane situated in parallel to the main plane of extension of the substrate, the drive directions associated with the at least four seismic masses extending along the drive plane, the at least four seismic masses being, in particular, exactly four seismic masses.

According to another refinement, it is provided that the multiple seismic masses include at least four additional seismic masses, the at least four additional seismic masses extending mainly along an additional drive plane situated in parallel to the main plane of extension of the substrate, the drive directions associated with the at least four additional seismic masses extending along the additional drive plane, the at least multiple seismic masses being, in particular, exactly eight seismic masses.

This makes it advantageously possible, by using eight seismic masses, to provide a compact rotation rate sensor, which is able to detect rotation rates about three different spatial axes and is still able to compensate for all interference terms—linear acceleration, rotational acceleration and centrifugal acceleration—with respect to all three rotation axes, as a result of the particular type of arrangement and the driving of the seismic masses, which makes a particularly precise detection of rotation rates possible.

According to another refinement, it is provided that the drive plane and the additional drive plane are situated above one another and spaced apart from one another along a normal direction perpendicular to the main extension plane of the substrate or are situated in the same plane.

This makes it advantageously possible to reduce the space required for the rotation rate sensor in a simple manner through an overlapping arrangement of the first through the fourth seismic mass with the fifth through the eighth seismic mass. In particular, using a manufacturing technique with multiple function layers or functional layers, two seismic masses, respectively, are situated above one another, at least partially overlapping or completely overlapping, along a projection direction parallel to the z-direction. In particular, the first seismic mass overlaps with the fifth, the second overlaps with the seventh, the third overlaps with the sixth and the fourth overlaps with the eighth in the manner indicated. Particularly, the rotation rate sensor may be improved still further with respect to space requirements and insensitivity to external interferences as a result of a symmetrical arrangement of the seismic masses.

Exemplary embodiments of the present invention are depicted in the drawings and explained in greater detail in the following description. In the various figures, identical parts are always provided with the same reference numerals and are therefore generally also cited or mentioned only once in each case.

BRIEF DESCRIPTION OF THE DRAWINGS

FIGS. 2A-C through 7A-C show a top view of a rotation rate sensor according to one specific embodiment of the present invention.

FIGS. 8A-C through 13A-C show an exploded view of a rotation rate sensor according to one specific embodiment of the present invention.

FIGS. 14A-C through 19A-C show a top view of a rotation rate sensor according to one specific embodiment of the present invention.

DETAILED DESCRIPTION

Figure 1:
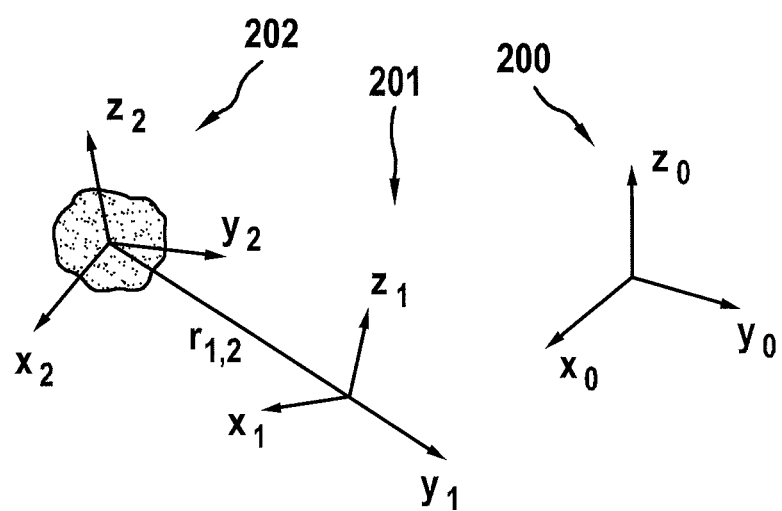
FIG. 1 shows a schematic view of a reference model.

FIG. 1 shows a schematic view of a reference model. Represented here are the basic correlations of a relative movement of a seismic mass in the system of seismic masses (reference numeral 202) in a reference system (reference numeral 201), the movement of which is to be measured relative to an inertial system 200. The relative movement of a seismic mass with body-fixed system 202 (coordinates $x_2$, $y_2$, $z_2$) in reference system 201 (coordinates $x_1$, $y_1$, $z_1$) is represented, which, in turn, moves arbitrarily in inertial system 200 (coordinates $x_0$, $y_0$, $z_0$).

The acceleration of the seismic mass is composed of a Coriolis acceleration, a linear acceleration, a rotational acceleration and a centrifugal acceleration. It was found that the linear acceleration component and the rotational acceleration component have a dominant influence on the respective measuring signal as compared to the centrifugal acceleration component. Advantageously according to the present invention, the compensation for the linear acceleration component and the rotational acceleration component are therefore given highest priority.

FIGS. 2A-C through 9A-C show a top view of a rotation rate sensor 1 according to various specific embodiments of the present invention. All of the rotation rate sensors 1 shown include multiple seismic masses 10, 20, 30, 40, 50, 60, 70, 80 connected to the substrate, which are resiliently connected to one another and to the substrate, in particular, with the aid of flexible spring structures. Seismic masses 10, 20, 30, 40, 50, 60, 70, 80 are, in particular, configured in such a way that they make the drive oscillations (drive movements) and/or deflection movements—also referred to as detection movements—possible. All the drive oscillations may be periodic, and particularly may be sinusoidal, drive oscillations.

Figure 2C:
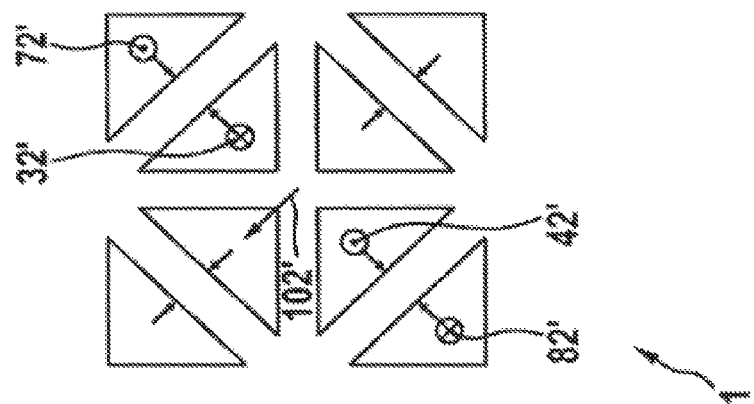
Figure 2B:
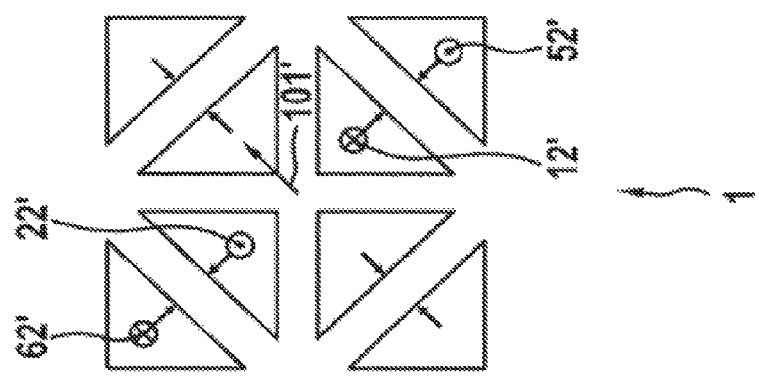
Figure 2A:
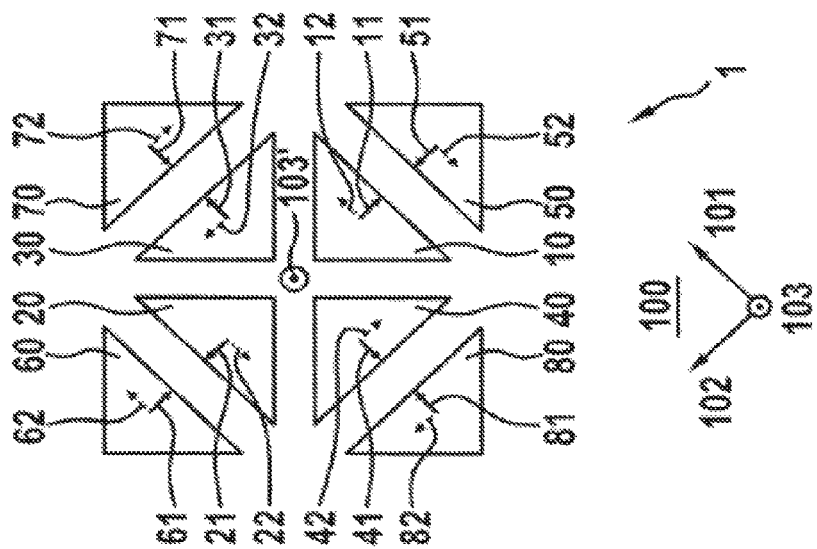

The specific embodiment of rotation rate sensor 1 shown in FIGS. 2A-C includes eight seismic masses 10, 20, 30, 40, 50, 60, 70, 80, which are situated in such a way and driven at the respective drive oscillations, that in each case, one component of the linear acceleration is compensated for along x-direction 101, y-direction 102 and z-direction 103 in such a way that in each case one component of the centrifugal acceleration is compensated for with respect to a first rotational movement of rotation rate sensor 1 about first rotation axis 101', to a second rotational movement about second rotation axis 102' and to a third rotational movement about third rotation axis 103', and that in each case one component of the rotational acceleration is compensated for with respect to the second rotational movement and the third rotational movement.

The principle of compensating for undesirable accelerations is described herein by way of example with reference to the specific embodiment shown in FIGS. 2A-C, the principle applying analogously for respectively corresponding seismic masses and corresponding deflection directions 12, 12', . . . 82, 82' of the other specific embodiments. Here, for example, the first component or x-component of the linear acceleration is compensated for in that first and second seismic mass 10, 20 are driven in phase opposition to one another along first and second drive direction 11, 21—in this case, parallel to y-direction 102—and are deflected in phase opposition in first and second deflection direction 12, 22—in this case parallel to x-direction 101—as a function of a third rotation rate about third rotation axis 103'. Compensation is carried out, for example, via the difference between a first detection signal 112 associated with first deflection direction 12, and a second deflection signal associated with second deflection direction 22. With the arrangement shown in FIG. 2A (left side), it is not possible to compensate for a third component of the rotational acceleration with respect to the third rotational movement about the third rotation axis, since first, second, third and fourth seismic masses 10, 20, 30, 40 are deflected in the same direction in first, second, third and fourth deflection direction 12, 22, 32, 42 along an orbit parallel to main extension plane 100 about third rotation axis 103'. The same applies accordingly for fifth, sixth, seventh and eighth seismic masses 50, 60, 70, 80. However, with the arrangement (middle) shown in FIG. 2B, it is possible to compensate for a first and second component of the rotational acceleration with respect to the first and second rotational movement about first and second rotation axis 101', 102'. For example, the insensitivity to a rotational acceleration with respect to the first rotational movement about first rotation axis 101' is achieved in that additional first, additional second, additional fifth and additional sixth deflection directions 12', 22', 52', 62' are oriented to corresponding seismic masses 10, 20, 50, 60 essentially perpendicularly to the respective direction of the rotational acceleration. This also applies accordingly to the centrifugal acceleration.

The specific embodiment shown in FIGS. 3A-C corresponds essentially to the specific embodiment described in FIGS. 2A-C, rotation rate sensor 1 in this case including eight seismic masses 10, 20, 30, 40, 50, 60, 70, 80, which are situated in such a way and are driven at the respective drive oscillations, that in each case one component of the linear acceleration is compensated for along x-direction 101, y-direction 102 and z-direction 103, that in each case one first, second and third component of the centrifugal acceleration is compensated for with respect to the first rotational movement, the second rotational movement and the third rotational movement, and that only a third component of the rotational acceleration is compensated for with respect to the third rotational movement.

The specific embodiment depicted in FIGS. 4A-C corresponds essentially to the specific embodiments previously described, rotation rate sensor 1 in this case including 8 seismic masses 10, 20, 30, 40, 50, 60, 70, 80, which are situated in such a way, and driven at the respective drive oscillations, that in each case all three components of the linear acceleration, all three components of the centrifugal acceleration and all three components of the rotational acceleration are compensated for.

Figures 5A, 5B, 5C:
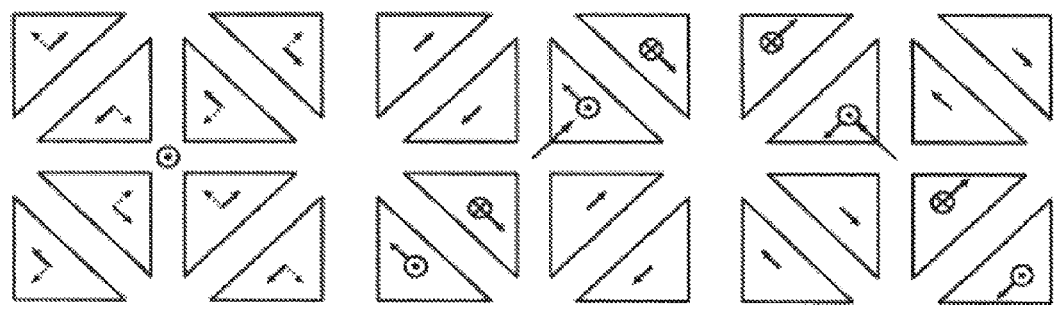

The specific embodiment depicted in FIGS. 5A-C corresponds essentially to the specific embodiments previously described, rotation rate sensor 1 in this case including 8 seismic masses 10, 20, 30, 40, 50, 60, 70, 80, which are situated in such a way, and driven at the respective drive oscillations, that in each case all three components of the linear acceleration, only the third component of the rotational acceleration with respect to the third rotational movement about third rotation axis 103', and only the first and second component of the centrifugal acceleration with respect to the first and second rotational movement about first and second rotation axis 101', 102' are compensated for.

Figures 6A, 6B, 6C:
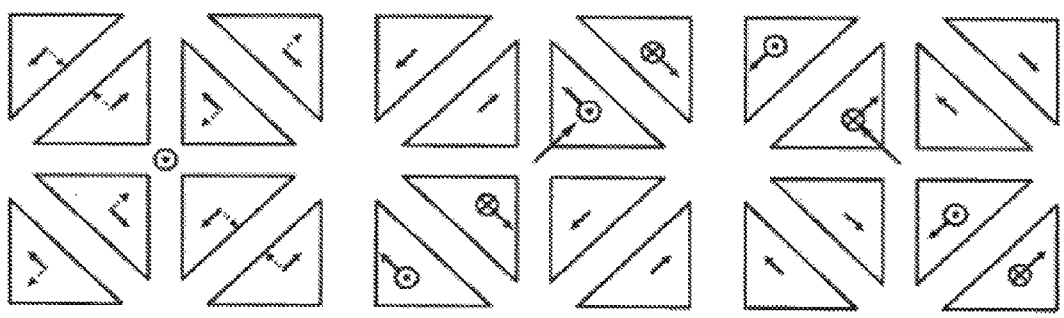
Figure 8A:
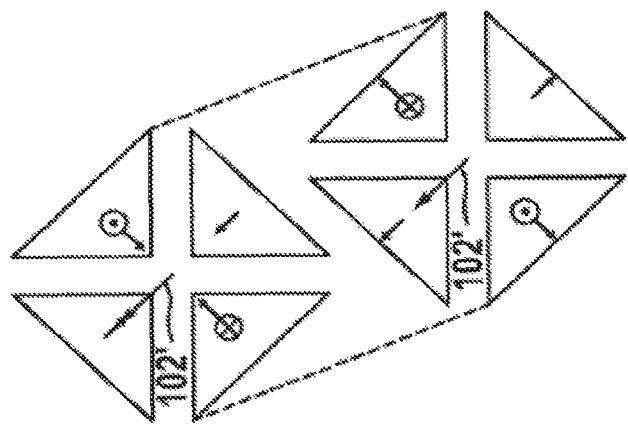
Figure 8B:
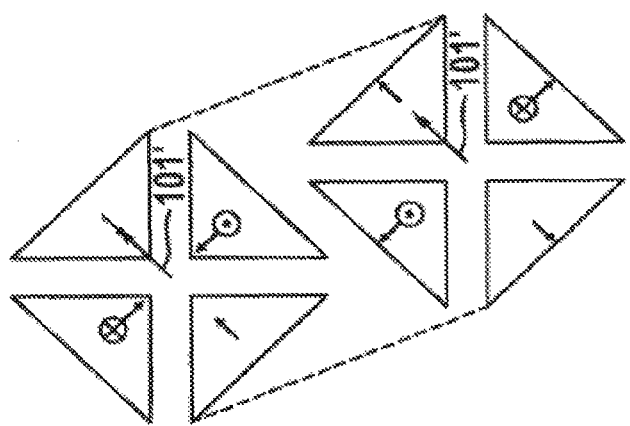
Figure 8C:
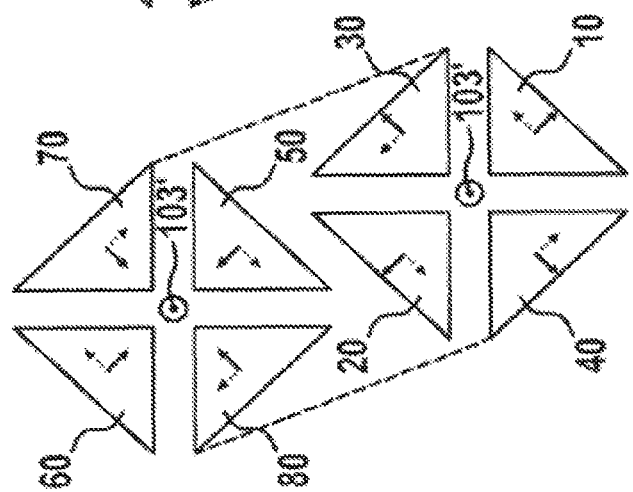
Figure 9C:
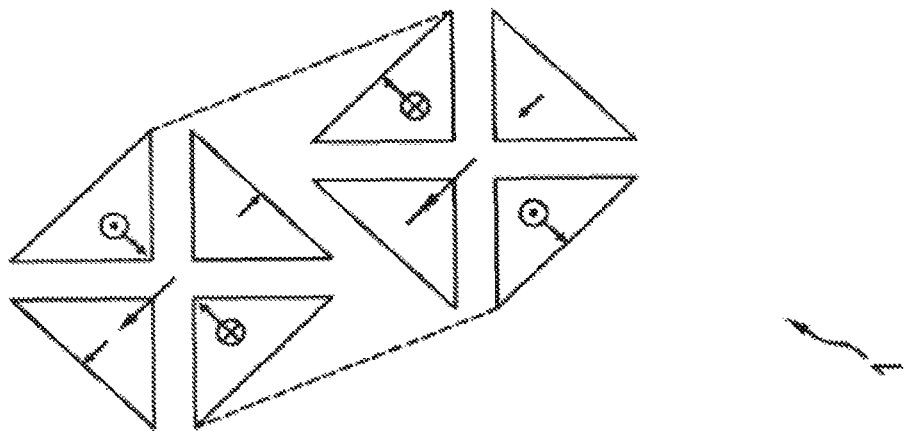
Figure 9B:
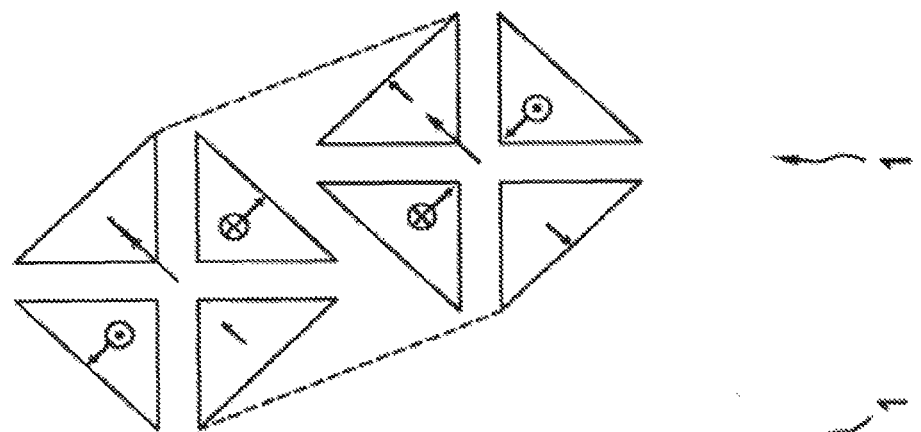
Figure 9A:
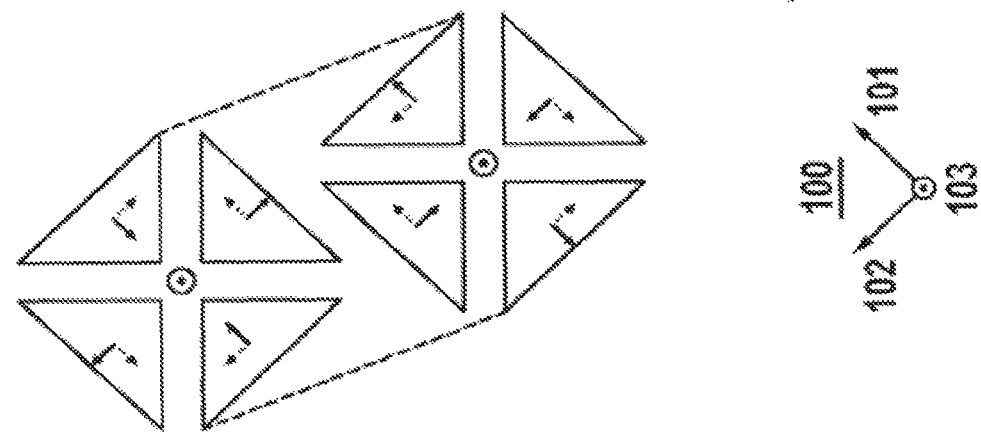

The specific embodiment shown in FIGS. 6A-C corresponds essentially to the specific embodiments previously described, rotation rate sensor 1 in this case including eight seismic masses 10, 20, 30, 40, 50, 60, 70, 80, which are situated in such a way, and driven at the respective drive oscillations, that in each case all three components of the linear acceleration, only the third component of the rotational acceleration with respect to the third rotational movement about third rotation axis 103' and all three components of the centrifugal acceleration are compensated for.

The specific embodiment shown in FIGS. 7A-C corresponds essentially to the specific embodiments previously described, rotation rate sensor 1 in this case including eight seismic masses 10, 20, 30, 40, 50, 60, 70, 80, which are situated in such a way, and driven at the respective drive oscillations, that in each case all three components of the linear acceleration, all three components of the centrifugal acceleration and all three components of the rotational acceleration are compensated for.

FIGS. 8A-C through 13A-C show an exploded view of a rotation rate sensor according to one specific embodiment of the present invention. In this case, first, second, third and fourth drive directions 12, 22, 32, 42 extend along a first plane essentially parallel to main extension plane 100, and fifth, sixth, seventh and eighth drive directions 52, 62, 72, 82 extend along a second plane essentially parallel to main extension plane 100, the first and the second plane being spaced apart from one another along z-direction 103.

The specific embodiments shown in FIGS. 8A-C through 13A-C correspond essentially to the specific embodiments described in FIGS. 2A-C through 7A-C, the specific embodiments differing from one another in that in the specific embodiments shown in FIG. 8A-C through 13A-C, first through fourth seismic mass 10, 20, 30, 40 are situated in the first plane, and fifth through eighth seismic mass 50, 60, 70, 80 are situated in the second plane in such a way that consistently, essentially in each case all three components of the linear acceleration, all three components of the centrifugal acceleration and all three components of the rotational acceleration are compensated for. For example, in the specific embodiment shown in FIGS. 8A-C (see left side) in each case first and fifth seismic mass 10, 50, second and sixth seismic mass 20, 60, third and seventh seismic mass 30, 70 and fourth and eighth seismic mass 40, 80 are situated completely overlapping along a projection direction parallel to z-direction 103. Such an arrangement makes it advantageously possible—for example, in contrast to the specific embodiment described in FIGS. 2A-C—to also compensate for the rotational acceleration with respect to the third rotational movement about third rotation axis 103'.

FIGS. 14A-C through 19A-C show a top view of a rotation rate sensor 1 according to one specific embodiment of the present invention. The specific embodiment shown herein corresponds essentially to the specific embodiments previously described, the rotation rate sensor in this case including four seismic masses 10, 20, 30, 40. Here, it is not possible in each case to compensate for all three components of the linear acceleration, the rotational acceleration and the centrifugal acceleration. For example, rotation rate sensor 1 shown in FIG. 18 includes four seismic masses 10, 20, 30, 40, which are situated in such a way, and are driven at the respective drive oscillations, that in each case all three components of the linear acceleration, only a third component of the rotational acceleration with respect to a third rotational movement about third rotation axis 103', and only a third component of the centrifugal acceleration with respect to the third rotational movement about third rotation axis 103' are compensated for.

Figure 20:
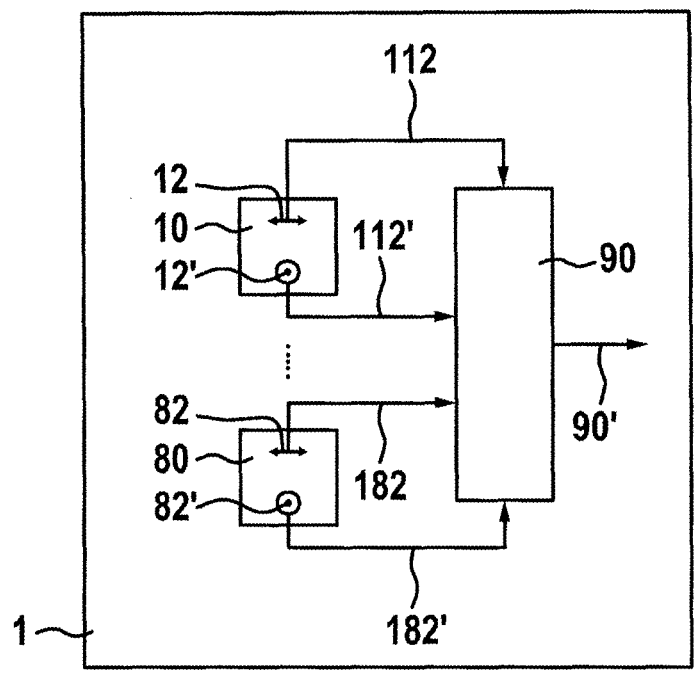
FIG. 20 shows a schematic view of a rotation rate sensor according to one specific embodiment of the present invention.

FIG. 20 shows a schematic view of a rotation rate sensor 1 according to one specific embodiment of the present invention. Rotation rate sensor 1 in this case includes 8 seismic masses 10, . . . , 80, and is configured to generate multiple detection signals 112, 112', . . . 182, 182'—in this case sixteen—as a function of an acceleration of rotation rate sensor 1. Each detection signal of multiple detection signals 112, 112', . . . , 182, 182' is associated with one of first, additional first, second, additional second, third, additional third, fourth, additional fourth, fifth, additional fifth, sixth, additional sixth, seventh, additional seventh, eighth or additional eighth deflection direction 12, 12', . . . , 82, 82', evaluation device 90 being configured to determine the first, second and third rotation rate in such a way that all three components of the linear acceleration, all three components of the rotational acceleration and/or all three components of the centrifugal acceleration are compensated for as a function of a compensation of at least two corresponding detection signals of multiple detection signals 112, 112', . . . , 182, 182'. In this case, the acceleration of the rotation rate sensor includes, in particular, the linear acceleration, the rotational acceleration and/or the centrifugal acceleration. The first, second and/or third rotation rate determined is transmitted, in particular, with the aid of one, two and/or three generated rotation rate signals 90' to a signal output of rotation rate sensor 1.

What is claimed is:

1. A rotation rate sensor, comprising:
   a rotation rate sensor arrangement including:
   a substrate having a main extension plane;
   multiple seismic masses, wherein for each seismic mass of the multiple seismic masses the following applies: (i) the seismic mass is drivable at a drive oscillation, the drive oscillation occurring along a drive direction situated in parallel to the main extension plane, and (ii) the seismic mass is deflectable along two different deflection directions, the two different deflection directions being situated perpendicularly to the drive direction, wherein the drive direction of at least one seismic mass extends along a first drive plane and the drive direction of at least one additional seismic mass extends along an additional drive plane, wherein the first drive plane and the additional drive plane are different from each other and are each situated in parallel to the main extension plane of the substrate;
   a detection device configured to:
   detect multiple deflections of each seismic mass along at least one of the two different deflection directions,
   generate multiple detection signals as a function of the multiple detected deflections of the multiple seismic masses, one detection signal of the multiple detection signals being associated with each deflection direction of the multiple seismic masses, and
   calculate the total of and/or the difference between the multiple detection signals to determine one or more of a linear acceleration, a rotational acceleration, and a centrifugal acceleration of each seismic mass; and
   an evaluation device configured to:
   determine a first rotation rate, a second rotation rate, and/or a third rotation rate of the rotation rate sensor arrangement with respect to at least one single rotation axis of the rotation rate sensor arrangement based on the determined one or more of the linear acceleration, the rotational acceleration, and the centrifugal acceleration, and
   use the calculated total of and/or difference between the multiple detection signals to resist one or more vibrations of the multiple seismic masses caused by the one or more of the linear acceleration, the rotational acceleration, and the centrifugal acceleration, wherein the one or more vibrations are resisted by driving at least two of the multiple seismic masses in phase opposition to each other along the drive direction of each of the at least two seismic masses and deflecting the at least two seismic masses in phase opposition to each other along the two different deflection directions as a function of a rotation rate of the at least one single rotation axis.

2. The rotation rate sensor of claim 1, wherein the rotation rate sensor arrangement is configured so that the linear acceleration, the rotational acceleration and the centrifugal acceleration of the rotation rate sensor arrangement are all determined with respect to each of three different rotation axes as a function of the multiple detection signals.

3. The rotation rate sensor of claim 2, wherein the multiple seismic masses are situated so that they are drivable at the drive oscillations, and wherein the rotational acceleration and the centrifugal acceleration are determined with respect to each of the three rotation axes by the evaluation device based on the corresponding detection signals.

4. The rotation rate sensor of claim 2, wherein the multiple seismic masses are resiliently connected to one another and to the substrate so that the multiple seismic masses are drivable at the drive oscillations so that the linear acceleration, the rotational acceleration and the centrifugal acceleration are determined with respect to the three rotation axes.

5. The rotation rate sensor of claim 1, wherein the multiple seismic masses include at least four seismic masses, which extend mainly along the first drive plane situated in parallel to the main extension plane of the substrate, the drive directions associated with the at least four seismic masses extending along the first drive plane, the at least four seismic masses being exactly four seismic masses.

6. The rotation rate sensor of claim 5, wherein the multiple seismic masses include at least four additional seismic masses, which extend mainly along the additional drive plane situated in parallel to the main extension plane of the substrate, the drive directions associated with the at least four additional seismic masses extending along the additional drive plane, the multiple seismic masses being exactly eight seismic masses.

7. The rotation rate sensor of claim 6, wherein the first drive plane and the additional drive plane are situated above one another and spaced apart from one another along a normal direction perpendicular to the main extension plane of the substrate.

8. A method for operating a rotation rate sensor including a substrate having a main extension plane and multiple seismic masses, the method comprising:
providing that the rotation rate sensor is acted upon by a first rotation rate about a first rotation axis of the rotation rate sensor, by a second rotation rate about a second rotation axis of the rotation rate sensor and/or by a third rotation rate about a third rotation axis of the rotation rate sensor, which is acted upon by a linear acceleration, a rotational acceleration and a centrifugal acceleration, wherein for each seismic mass of the multiple seismic masses the following applies: (i) the seismic mass is drivable at a drive oscillation, the drive oscillation occurring along a drive direction situated in parallel to the main extension plane, and (ii) the seismic mass is deflectable along two different deflection directions, the two different deflection directions being situated perpendicularly to the drive direction, wherein the drive direction of at least one seismic mass extends along a first drive plane and the drive direction of at least one additional seismic mass extends along an additional drive plane, wherein the first drive plane and the additional drive plane are different from each other and are each situated in parallel to the main extension plane of the substrate;
detecting multiple deflections of each seismic mass along at least one of the two different deflection directions;
generating multiple detection signals as a function of the multiple detected deflections of the multiple seismic masses, one detection signal of the multiple detection signals being associated with each deflection direction of the multiple seismic masses;
calculating the total of and/or the difference between the multiple detection signals to determine one or more of the linear acceleration, the rotational acceleration, and the centrifugal acceleration of each seismic mass;
determining the first, second and/or third rotation rates of the rotation rate sensor with respect to at least one of the first rotation axis, the second rotation axis, and the third rotation axis of the rotation rate sensor based on the determined one or more of the linear acceleration, the rotational acceleration, and the centrifugal acceleration; and
using the calculated total of and/or difference between the multiple detection signals to resist one or more vibrations of the multiple seismic masses caused by the one or more of the linear acceleration, the rotational acceleration and the centrifugal acceleration, wherein the one or more vibrations are resisted by driving at least two of the multiple seismic masses in phase opposition to each other along the drive direction of each of the at least two seismic masses and deflecting the at least two seismic masses in phase opposition to each other along the two different deflection directions as a function of a rotation rate of the at least one of the first, second, and third rotation axes.

* * * * *